April 8, 1924.

P. C. VOGEL

BOBSLED

Filed Feb. 12, 1921

1,489,289

INVENTOR.
Paul C. Vogel
BY Frank W. Hubbard
ATTORNEYS.

Patented Apr. 8, 1924.

1,489,289

UNITED STATES PATENT OFFICE.

PAUL C. VOGEL, OF MILWAUKEE, WISCONSIN.

BOBSLED.

Application filed February 12, 1921. Serial No. 444,309.

*To all whom it may concern:*

Be it known that I, PAUL C. VOGEL, a citizen of the United States, residing at Milwaukee, in the county of Milwaukee and State of Wisconsin, have invented new and useful Improvements in Bobsleds, of which the following is a full, clear, concise, and exact description, reference being had to the accompanying drawing, forming a part of this specification.

This invention relates to bob-sleds and more particularly to improvements in steering means therefor.

The invention has among its objects to provide a bob-sled having steering runners secured to the body of the sled through the medium of a universal joint.

Another object is to provide a bob-sled of the aforesaid character having means for locking the steering runners of the sled in alignment with the other runners thereof.

Another object is to provide a bob-sled wherein the aforesaid locking means is associated with the steering member.

Various other objects and advantages of the invention will hereinafter appear.

The accompanying drawing illustrates an embodiment of the invention which will now be described it being understood that the embodiment illustrated is susceptible of various modifications without departing from the scope of the appended claims.

In the drawing:—

Figure 1:
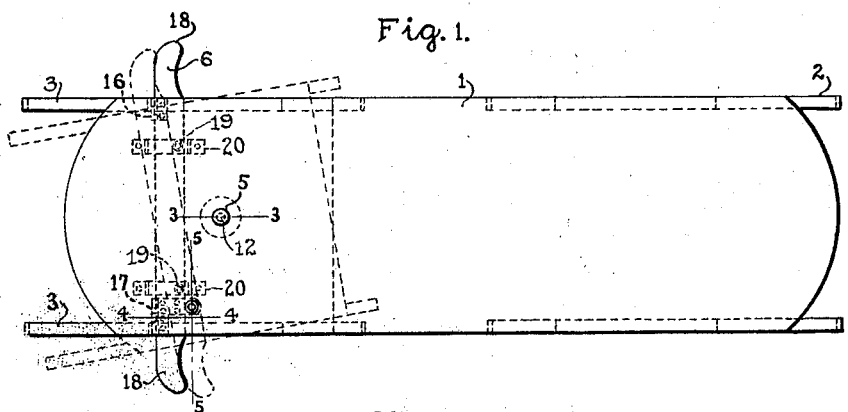
Fig. 1 is a top plan view of a bob-sled embodying the invention.
Figure 2:
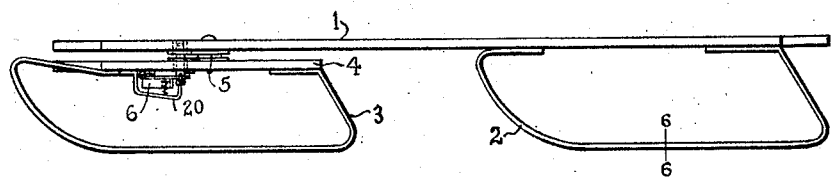
Fig. 2 is a side elevational view of the bob-sled shown in Fig. 1.
Figure 3:
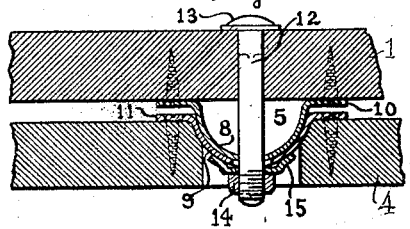
Figure 4:
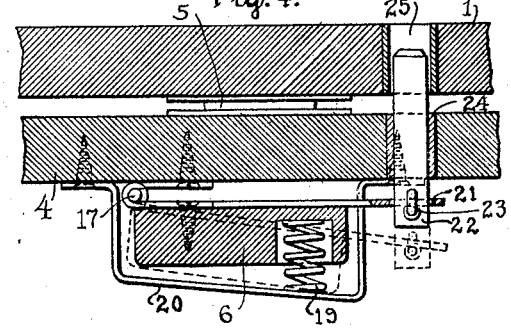
Figure 5:
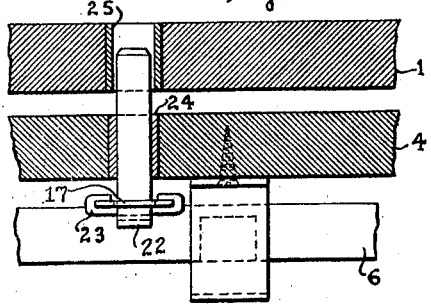
Figure 6:

Figs. 3, 4 and 5 are enlarged sectional views taken on lines 3—3, 4—4 and 5—5 respectively of Fig. 1; and, Fig. 6 is a cross sectional view of the runners shown in Figs. 1 and 2.

Referring to Fig. 1 the same illustrates a bob-sled including a body 1, a pair of fixed runners 2 mounted on the rear end thereof and a pair of steering runners 3 mounted on the front end thereof. The runners 3 are fixed to a supporting member 4 which is secured to body 1 through the medium of a universal joint 5 and carries a steering member 6 having locking means associated therewith for locking said steering runners in alignment with the fixed runners 2.

The runners 2 and 3 are formed from metal strips and as shown in Fig. 6 the cross section of the strips is such as to provide a concave running face 7 to prevent skidding of the sled on icy surfaces. The universal joint 5 is formed of sheet metal stampings and comprises a ball member 8 and a cup member 9 the former having a projecting annular flange 10 and the latter having a projecting annular flange 11. Ball member 8 is secured to the lower face of body 1 by screws passing through the flange 10 while cup member 9 is arranged within an opening in supporting member 4 and is secured to the upper face thereof by screws passing through flange 11. The cup and ball members 8 and 9 are provided with a central opening to receive a bolt 12 which passes through body 1 and is provided with a head 13 on its upper end and a nut 14 on its lower end for holding a cup washer 15 against the outer face of cup member 9. As shown in Fig. 3 the flange 11 of cup member 9 is spaced from flange 10 of ball member 8 and the central opening in said cup member 9 is of larger diameter than bolt 12 to permit a limited rocking movement of supporting member 4 and the steering runners 3 carried thereby with respect to body 1.

The steering member 6 is secured to the lower face of supporting member 4 by hinges 16 and 17 and said member projects outwardly on opposite sides of the bob-sled and is formed to provide handles 18. The upper leaves of the hinges 16 and 17 are secured to the lower face of member 4 while the lower leaves thereof are secured to the upper face of steering member 6. Steering member 6 is biased to swing upwardly on said hinges by springs 19 located in recesses in the lower face of said steering member and engaging a stirrup member 20 secured to the lower face of supporting member 4. The lower leaf of hinge 17 projects beyond the rear edge of steering member 6 as shown in Fig. 4 and the same is provided with an opening 21 to receive a locking member 22. Locking member 22 is secured to the lower leaf of hinge 17 by a pin 23 which passes through an opening in said member and has its opposite ends bent upwardly around the opposite sides of said leaf as shown in Fig. 5. Said locking member projects upwardly through a metal bushing 24 secured within an opening in supporting member 4 and body 1 is provided with a bushing 25 to receive the upper end of said member when the steering runners 3 are in alignment with the fixed runners 2. As shown in Fig. 4 when the steering member 4 is rocked downwardly on its hinges from its full line position to its dotted line position locking member 22 is moved out of engagement with bushing 25, and the steering member can then be moved in opposite directions from the position shown in full lines (Fig. 1) to steer the bob-sled in the usual manner. To facilitate movement of the locking member 22 into bushing 25 the upper end thereof is tapered. Also the diameter of member 25 is such that the same moves freely within bushing 25 when the runners are rocked about the universal joint 5.

What I claim as new and desire to secure by Letters Patent is:

1. In a bob-sled, in combination, a body, a plurality of runners mounted thereon, certain of said runners being fixed to said body and certain others being swiveled thereon, a steering member for said latter runners and means operable by certain movements of said member for locking and releasing said latter runners when the same are in alignment with the former.

2. In a bob-sled, in combination, a body, a plurality of runners fixed thereto, a plurality of steering runners, a supporting member for the latter, means including a ball and socket joint for securing said supporting member to said body, a steering handle mounted on said supporting member, and releasable locking means associated with said steering handle for locking said member to said body in a position wherein said steering runners are in alignment with said fixed runners.

3. In a bob-sled, in combination, a body, a plurality of runners fixed thereto, a plurality of steering runners, a supporting member for the latter, means including a ball and socket joint for securing said supporting member to said body, a steering handle mounted on said supporting member, and releasable locking means associated with said steering handle for locking said member to said body in a position wherein said steering runners are in alignment with said fixed runners, said means permitting a rocking movement of said supporting member on said joint with respect to said body.

4. In a bob-sled, in combination, a body, a plurality of runners fixed thereto, a plurality of steering runners, a supporting member for the latter, means including a ball and socket joint for securing said member to said body, a steering handle secured to said supporting member, said member being oscillatable in a vertical plane and a locking member associated with said steering handle and movable into and out of engagement with said body upon oscillation of said steering handle.

In witness whereof, I have hereunto subscribed my name.

PAUL C. VOGEL.